United States Patent [19]
Igarashi et al.

[11] 3,739,189
[45] June 12, 1973

[54] DEVICE FOR STOPPING A TURNTABLE AT SELECTED POSITIONS

[75] Inventors: Shunkichi Igarashi, Tokyo; Takeshi Okano, Nishinomiya, both of Japan

[73] Assignee: Fuji Photo Film Co., Ltd., Kanagawa, Japan

[22] Filed: May 26, 1972

[21] Appl. No.: 257,207

[30] Foreign Application Priority Data
May 31, 1971 Japan .............................. 46/37720

[52] U.S. Cl. .............................................. 307/117
[51] Int. Cl. ........................................... H01h 47/24
[58] Field of Search .................. 307/112, 117, 116; 340/162; 274/10 D; 209/80.5; 40/36

[56] References Cited
UNITED STATES PATENTS

| | | | |
|---|---|---|---|
| 2,553,003 | 5/1951 | Popoff | 40/36 |
| 3,313,055 | 4/1967 | Irasek | 40/36 |
| 3,482,687 | 12/1969 | Irasek | 209/80.5 |

*Primary Examiner*—Robert K. Schaefer
*Assistant Examiner*—M. Ginsburg
*Attorney*—Richard C. Sughrue, Gideon Franklin Rothwell, John H. Mion et al.

[57] ABSTRACT

A turntable having a plurality of sections containing information cards is provided with control means for accurately stopping the turntable at selected positions to permit retrieval of a desired card. The control means comprises an arrangement of cams, cam-operated switches, and a photoelectric circuit including a light-interrupting disc continuously driven in synchronism with the rotation of the turntable.

4 Claims, 6 Drawing Figures

DEVICE FOR STOPPING A TURNTABLE AT SELECTED POSITIONS

BACKGROUND OF THE INVENTION

1. Field of the Invention

This invention relates to a device for stopping a turntable at a selected position among predetermined positions, and more particularly to a device for rotation and stopping a cylindrical magazine having a number of radial sections at a selected position for retrieval of one of the radial sections.

2. Description of the Prior Art

It is well known in the prior art to retrieve information cards and the like by use of a cylindrical magazine containing a number of information cards, such as index cards, microfiche and the like, stored therein in a radial arrangement. For example, U.S. Pat. No. 3,313,055 and U.S. Pat. No. 3,482,687 show this type of magazine. In such a conventional device for retrieving information cards, the cards were provided with retrieval codes, and the codes were detected by a detecting device for retrieving the information. However, this kind of retrieval system has the great disadvantages of requiring a highly complex code system and having slow access time in the case where a great number of information cards, such as several hundred to several thousand, are to be retrieved.

In order to overcome the above disadvantages, it is desirable to pre-sort the information cards in advance into a much lower number of pre-sorted groups and to retrieve the desired information card from among the pre-sorted groups by the use of codes and the like.

To use such a system as just described above, it is necessary first to retrieve or select the pre-sorted group wherein the desired information card is included.

SUMMARY OF THE INVENTION

The primary object of the present invention is to provide a device for carrying out this first step of retrieving or selecting the presorted group. In other words, the present invention provides a device for stopping a cylindrical magazine having a number of radial sections containing the pre-sorted group of information cards at a selected position, wherein a radial section containing the desired group of information cards is in front of a predetermined position where a retrieving device for retrieving the desired information card among the group of cards is located.

In order to accomplish the above mentioned primary object of the present invention, a turntable for rotating the cylindrical magazine is provided with a cam member concentrically fixed thereto. The cam engages a series of electric contacts for operating an electromagnetic clutch and a brake for stopping the magazine at the desired position.

Another important object of the present invention is to provide a device for accurately regulating the stopping position of the magazine regardless of the timing error caused by the position error of the contacts to be closed by the cam for stopping the cylindrical magazine at a selected position. In other words, the present invention provides a device for stopping a cylindrical magazine at an extremely accurate position for retrieval of the information cards contained in the selected section of the magazine by providing a means for overcoming errors in manufacturing the electrical contact arrangement.

In order to accomplish the above mentioned second object of the present invention, a clock pulse is generated in synchronism with the rotation of the turntable, and a relay switch is closed by the clock pulse for operating an electromagnetic brake and a clutch during the comparatively long time of engagement of the contacts closed by the cam.

Other objects, features and advantages of the present invention will be made apparent from the following description of a preferred embodiment of the invention taken in conjunction with the accompanying drawing.

DESCRIPTION OF THE PREFERRED EMBODIMENT

Figure 1:
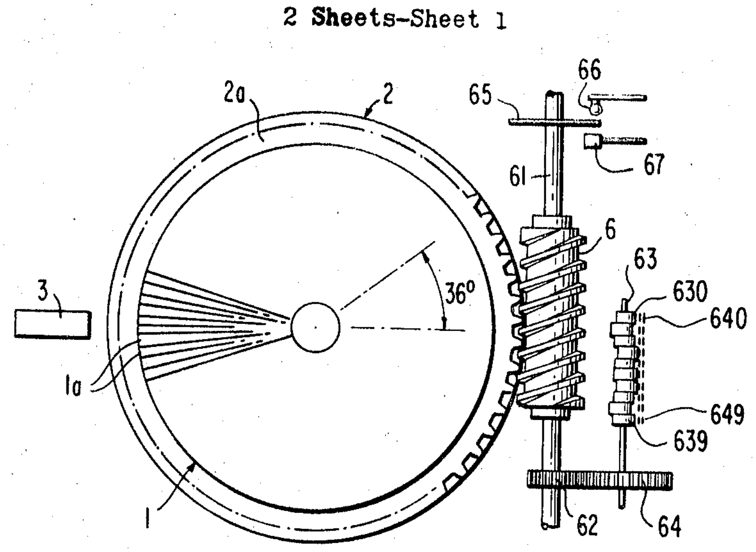
FIG. 1 is a plan view showing a schematic construction of the turntable stopping device in accordance with the preferred embodiment of the present invention.
Figure 2:
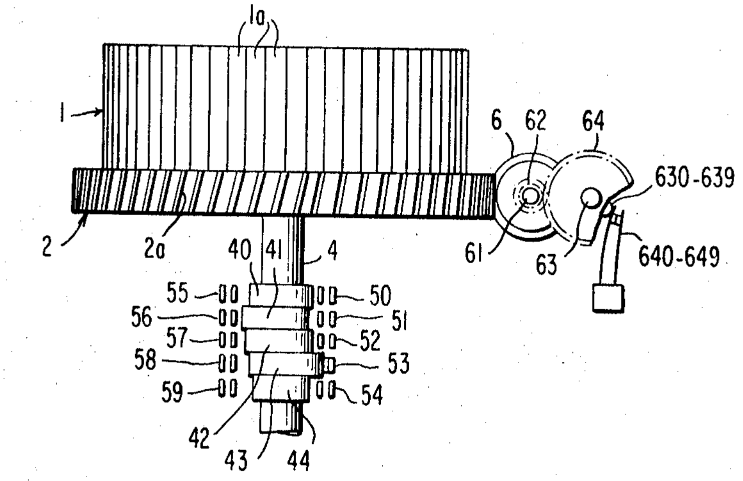
FIG. 2 is a side elevational view, partly cut away, of the device shown in FIG. 1.

Now referring to FIGS. 1 and 2, a cylindrical magazine 1 having a number of radial sections 1a is placed concentrically on a turntable 2. The magazine 1 is removably mounted on the turntable 2 and is engaged therewith at a predetermined position. At a proper position around the periphery of the turntable, a retrieving device 3 is located for retrieving a desired information card from among the cards in each of the sections 1*a*. The retrieving device 3 selects or retrieves a desired card in a section 1*a* and removes the card from the section while the magazine 1 is stopped.

Alternatively, if the number of the cards within one radial section 1a of the cylindrical magazine 1 is small enough for a man to select manually the wanted card, the retrieving device may be omitted. Further, in some uses of the retrieval device, only one information card is contained in each section 1a of the magazine so that the selective stopping of the turntable 2 results in a final retrieval of the desired information. In such a case, of course, the retrieval device 3 can be eliminated.

In the preferred embodiment described below, the device will be assumed to have, as an example, a magazine having 100 radial sections 1*a*. In other words, in this embodiment, a magazine 1 having sections with numbers from 00 to 99 is stopped at a position where the section 1*a* of one number is in front of the retrieval device 3 or at the card removal position when that number is inputted.

Figure 3:
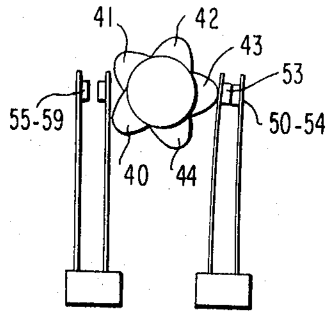
FIG. 3 is a partial bottom view showing the relationship between the cams and the electrical contacts to be closed thereby for controlling the stopping position of the turntable according to the invention.

As clearly shown in FIGS. 2 and 3, the rotatable shaft 4 of the turntable 2 is provided with five cams 40, 41, 42, 43 and 44 with the maximum radius portions thereof angularly spaced by 72°. Ten pairs of contacts 50, 51, 52 – 59 are provided on the opposite sides of the cams 40 to 44 with five pairs of each side. The ten pairs of contacts 50 and 59 are each closed once during one revolution of the shaft 4. The relation between the cams 40 and 44 are the contacts 50 to 59 will be apparent from FIGS. 2 and 3. The contacts are closed in the following order: first, the cam 40 closes the contact pair 50; then the cam 42 closes the contact pair 57; cam 44 closes 54; cam 41 closes 56; cam 43 closes 53; cam 40 closes 55; cam 42 closes 52; cam 44 closes 59; cam 41 closes 51; and cam 43 closes the contact pair 58, thereby constituting one cycle of contact closures by one revolution of the shaft 4. Of course, if there is enough space, ten cams may be provided instead of the five cams with an angular spacing of 36° between adjacent cams.

As shown in FIGS. 1 and 2, an annular worm wheel 2*a* is provided around the periphery of the turntable 2 in meshing engagement with a worm gear 6 located along the tangential direction of the turntable 2. By the rotation of the worm gear 6, the turntable 2 is rotated. It will be readily understood that the annular worm wheel 2*a* may be replaced by worm wheel teeth formed directly on the periphery of the turntable 2. The worm gear 6 is fixed to a driving shaft 61 which is in turn rotated by a driving means, such as a motor (not shown). The driving shaft 61 is further provided with another gear 62 which is meshed with a gear 64 which is in turn fixed to a cam shaft 63 extending in parallel to driving shaft 61 for rotating the cam shaft 63 at an angular speed which is ten times as fast as that of the turntable 2, whereby cam shaft 63 is rotated 10 times for each revolution of the turntable. The cam shaft 63 is provided with 10 cams 630 to 639 with an angular spacing of 36° between the maximum radius portions thereof so as sequentially to close and open the 10 pairs of contacts 640 to 649 during one revolution of the cam shaft 63.

Figure 4:
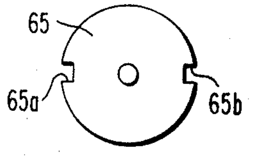
FIG. 4 is a front view showing the shape of a sector for generating a clock pulse employed in the device of the present invention.

The driving shaft 61 is provided with a sector 65 which is rotated between a light source 66 and a phototransistor 67 which receives from the light source 66 light which is periodically interrupted by the sector 65. The sector 65 is provided with a pair of cut away portions 65*a* and 65*b* as shown in FIG. 4 for transmitting the light from the light source 66 to the phototransistor 67, 10 times periodically and instantaneously during one revolution of the cam shaft 63. In the embodiment shown in the drawing, the ratio of the angular speed of the driving shaft 61 to that of the cam shaft 63 is 5 to 1, and accordingly, a pair of cut away portions 65*a* and 65*b* are provided on the periphery of the sector 65 for carrying out the above described mode of light transmission.

As is apparent from the above description, the ratio of angular rotational speeds of the shaft 4, driving shaft 61 and cam shaft 63 is 1:50:10. Therefore, the ratio between the number of revolutions of the shaft 4, the number of light pulses received by the phototransistor 67, and the number of revolutions of the cam shaft 63 is 1:100:10.

As will be understood from the above description of the preferred embodiment of the invention, the cams 40 to 44, hereinafter referred to as the first cam group, provided on the shaft 4 and the contact pairs 50 to 59, hereinafter referred to as the first contact group, closed and opened by the first cam group are used for detecting the tens digit of a two-place number for retrieving one section among the 100 sections of the magazine, and the cams 630 to 639, second cam group, provided on the cam shaft 63 and the contact pairs 640 to 649, second contact group, are used for detecting the units digit of the number for retrieval of the section.

As an input device, there may be used a key board (not shown) having ten buttons for the input of the tens digits of the two-place numbers of the sections 1*a* and having 10 buttons for the input of the units digits of the numbers. This key board may be replaced, or course, by a modified one which has only 10 buttons which can be used either for the tens digits or for the units digits, such a modification being accomplished by a known means for switching the circuit of the input key buttons.

Figure 5:
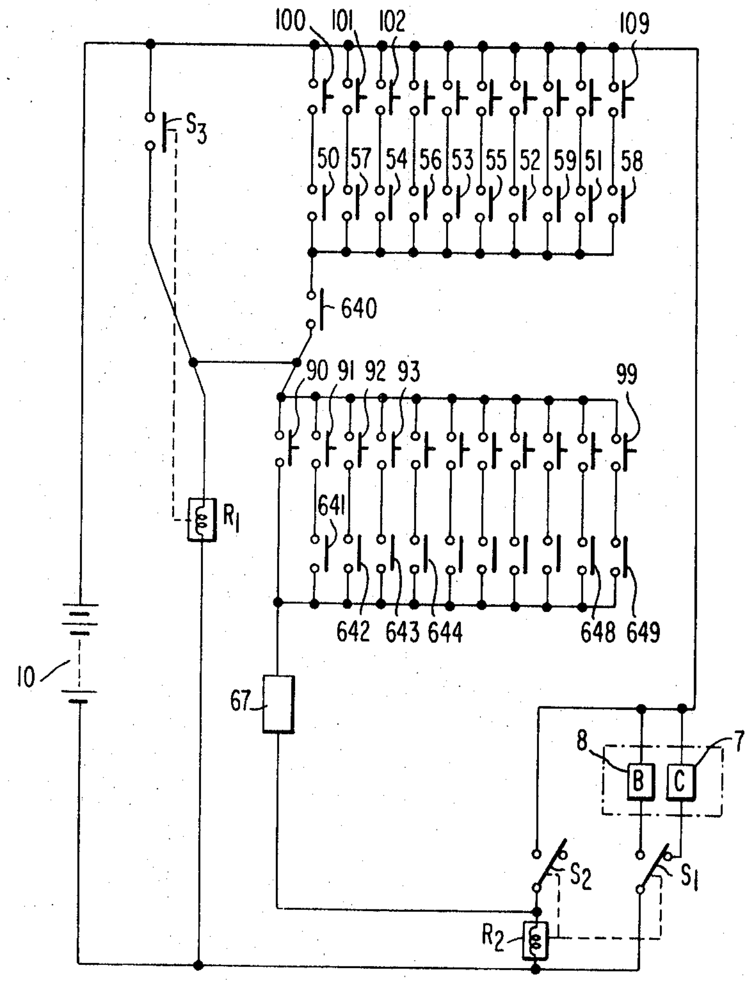
FIG. 5 is a circuit view showing the main portion of the electric circuit employed in the device of the present invention for controlling the accurate operation of the electric contacts of the device.

FIG. 5 shows in detail the electric circuit for actuating the sector and the brake so that the magazine section corresponding to the input number is stopped at a predetermined position relative to the retrieving device 3.

As shown in FIG. 5, an electromagnetic clutch 7 and an electromagnetic brake 8, which directly control the rotation of the turntable 2 and are connected in parallel with each other, are connected across a power source 10 by way of a selective relay switch $S_1$ having two contacts so that only either the clutch or the brake may be actuated at the same time.

In other words, in the circuit shown in FIG. 5, the driving shaft 61 is driven by a motor (not shown) to rotate the turntable 2 when the selective switch $S_1$ is closed to the clutch contact. On the other hand, when the switch $S_1$ is closed to the brake contact, the driving shaft 61 is disconnected from the power source 10, and the brake 8 is actuated to brake the shaft 61 and stop its rotation. Connected in parallel with the circuit consisting of the brake 8, the clutch 7 and the selective switch $S_1$ is a series circuit consisting of an on-off relay switch $S_2$ and a relay coil $R_2$ for closing switch $S_2$. When energized, the relay $R_2$ also closes the selective switch $S_1$ To the brake contact.

In other words, these switches $S_1$ and $S_2$ are closed to actuate the brake 8 only when the relay $R_2$ is energized. The relay $R_2$ is further connected in series with a parallel circuit including the second contact pairs 641 to 649, but excluding contact pair 640 corresponding to the unit digits "0," and also including group of push buttons 90 to 99 for inputting the units digits, as shown in FIG. 5. In parallel with a relay switch $S_3$ is connected a series circuit consisting of the contact pair 640 and a parallel circuit consisting of a group of push button switches 100 to 109 for inputting of the tens digits, each push button switch being connected in series with a corresponding one of the first group of contacts 50 to 59, as shown in FIG. 5. The junction point between the relay switch $S_3$ and the push button switch group 90 to 99 is connected via a relay coil $R_1$ to the junction point between the relay coil $R_2$ and a power source such as battery 10. When energized, the relay $R_1$ closes the relay switch $S_3$.

The operation of the above described circuit will now be explained.

First, the number of the desired card sections of the magazine is inputted by pushing the buttons selectively. Now assuming, for example, that the section No. 23 is to be retrieved through the device in accordance with the present invention, switch 102 in the push button switch group 100 to 109 is closed for selection of the number "2" as the tens digit, and at the same time or subsequent thereto the switch 93 in the push button switch group 90 to 99 is closed for selection of the number "3" as the units digit. As the turntable 2 is rotated by the driving means, such as a motor, the shaft 4 is rotated so that cams 40 to 44 sequentially close the contacts 50 to 59. Since no current flows through the relay coil $R_2$, the coil is not energized, and the relay switch $S_1$ is closed to the contact of clutch 7. Since the push button switch 102 is closed, an electric current path up to the contact pair 640 is formed only when the contact pair 54 in the first contact group 50 to 59 is closed. Meanwhile, the second group of contacts is sequentially closed by the rotation of the cam shaft 63 while one contact of the first contact group is closed. Furthermore, since the contact 640 is closed during each revolution of the cam shaft 63 (as will be explained below in connection with FIG. 6), the current flows into the relay coil $R_1$ through the switch 102, the contact pair 54 and the closed contact pair 640. The energization of the relay $R_1$ closes relay switch $S_3$, and current continues to flow through the relay coil $R_1$ even after the second contact 640 is opened.

Then, when the contact pair 643 in the second group is closed, the current flows through the closed contact pair 93 and the contact pair 643 to the phototransistor 67. While the contacts in the second group are closed sequentially, the phototransistor 67 is instantly illuminated with the light coming through the sector 65 so that the current flows instantly through the phototransistor 67. At this instant, accordingly, electric current flows through the relay coil $R_2$. Therefore, the relay coil $R_2$ is actuated by the clock pulse produced by the sector 65 to close the selective switch $S_1$ to the brake contact and to close the on-off relay switch $S_2$.

Since the sector 65 is directly interlocked or engaged with the turntable 2 as clearly seen from FIG. 1, the stopping position of the turntable 2 can be accurately determined regardless of any error in the timing of the closing and opening of the contacts.

Figure 6:
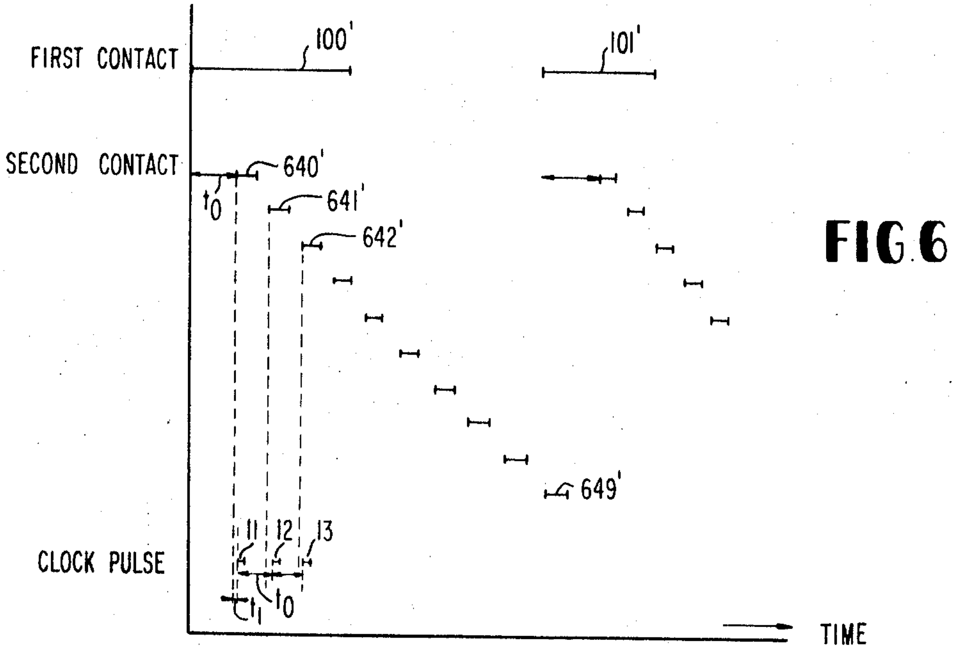
FIG. 6 is a graphical representation showing the timing between the periods of closing of the contacts and the clock pulses in the device of the present invention.

The timing between the clock pulses generated by the sector 65 and the instantaneous opening and closing of the contacts in the second group is illustrated in the graphical representation in FIG. 6. The uppermost line sections 100′ and 101′ in the graph represent the closing times of the contacts 100 and 101 in the first group of contacts. The shorter line sections 640′, 641′ . . . represent the closing times of the contacts 640, 641 . . . in the second group of contacts. The lowermost shortest line sections 11, 12, 13 . . . represent the times during which the current flows through the phototransistor 67 owing to the illumination thereof through the sector 65.

As is apparent from FIG. 6, the start of the closing time of the second contact 640 is delayed by $t_0$ from the start of the closing time of the first contact. The start of the clock pulse is delayed from the start of the closing of the second contact 640 by $t_1$.

The delays $t_0$ and $t_1$ are designed to be longer than the error in timing of the first contact, second contact and the clock pulse. Therefore, the second contact is closed after the first contact is closed without fail even if there is some error in the timing of the closing contacts. Further, once a first contact an the second contact 640 are closed, every second contact 641 and 649 is provided with current through the relay switch $S_3$. Therefore, there is no need for the closing time of the first contact 100′ to last until the start of the closing time of the last second contact 649′. This is also advantageous to the design and manufacture of the device in the sense that the error tolerance is not so strictly limited. In other words, once the retrieval is transferred from the tens digit to the units digit, the contacts and other circuits for the tens digit retrieval have nothing to do with the retrieval upon operation.

As clearly described hereinabove, the stopping position of the cylindrical magazine is accurately determined in accordance with the present invention owing to the large allowance for the error in timing of the closing of the contacts for actuating the elements which control the movement of the magazine.

It will be readily understood that the above description of the present invention has been particularly referred to a preferred embodiment, and various modifications of the invention may be made to accommodate different numbers of sections of the magazine, button switches and cams, and different positions of the sector, cams and gears, and also different types of the gears and so forth, while remaining within the scope of the invention.

We claim:

1. A device for stopping a turntable at selected positions comprising:

a. a first cam group rotated proportionately with the rotation of the turntable;

b. a first contact group sequentially closed by said first cam group as the turntable rotates;

c. a second cam group rotated proportionately with the rotation of the turntable;

d. a second contact group sequentially closed by said second cam group as the turntable rotates, the sequential closing of the second contacts having a period shorter than that of the first contacts by one order;

e. a first push button switch group connected with said first contact group;

f. a second push button switch group connected with said second contact group;

g. a light source and a light responsive means, synchronism with the rotation of the turntable;

h. a relay connected in series with said contacts and said light responsive means; and i. an electromagnetic brake connected with said relay so as to be actuated thereby for stopping the rotation of the turntable.

2. A device according to claim 1 wherein said light responsive means comprises a phototransistor.

3. A device according to claim 2 further comprising:

a. a rotating sector disposed between said light source and said phototransistor so that said phototransistor is illuminated through said sector, and b. shaft means for rotating said sector proportionately with the rotation of the turntable.

4. A device according to claim 3 wherein both the turntable and said sector are driven by said shaft means.

* * * * *